United States Patent [19]
Jenkins

[11] 4,101,937
[45] Jul. 18, 1978

[54] AUTOMATIC AZIMUTH CONTROL FOR MAGNETIC TAPE RECORDING AND REPRODUCING APPARATUS

[75] Inventor: John P. Jenkins, Towanda, Ill.

[73] Assignee: International Tapetronics Corporation, Bloomington, Ill.

[21] Appl. No.: 851,499

[22] Filed: Nov. 14, 1977

Related U.S. Application Data

[63] Continuation-in-part of Ser. No. 740,958, Nov. 11, 1976, abandoned.

[51] Int. Cl.² ............................................. G11B 5/43
[52] U.S. Cl. ...................................... 360/76; 360/109
[58] Field of Search .................................. 360/76, 109

[56] References Cited

U.S. PATENT DOCUMENTS

| | | | |
|---|---|---|---|
| 2,937,239 | 5/1960 | Garber, Jr. et al. | 360/76 |
| 2,938,962 | 5/1960 | Konins et al. | 360/76 |
| 3,526,726 | 9/1970 | Corbett et al. | 360/76 |

OTHER PUBLICATIONS

IBM Technical Disclosure Bulletin, vol. 11, No. 9, Feb. 1969, pp. 1146–1147, "Tape Drive Motor Alignment Apparatus" by D. S. Borm.

*Primary Examiner*—John H. Wolff
*Attorney, Agent, or Firm*—McCaleb, Lucas & Brugman

[57] ABSTRACT

Automatic azimuth control for a multi-track magnetic tape recorder-reproducer. This is illustrated as stereo apparatus having a recording head with right and left recording gaps through which signals are recorded respectively on right and left tracks on the tape, and a reproducing head with right and left reproducing gaps through which the signals on the right and left tracks are reproduced. An azimuth control circuit simultaneously starts the tape drive and actuates a tone generator to record test signals in phase on the tape tracks. The test signal reproductions from the respective right and left gaps of the reproducing head are fed to a phase comparator which senses their time relationship. An azimuth motor, responsive to this time relationship skews one of the heads relative to the tape in a direction to bring the test signal reproductions into phase with one another. When they are brought into phase, the azimuth control circuit is automatically deactuated and the tape drive is stopped. The test signals so recorded and reproduced may be a fixed frequency such as 3000 cycles per second, or may be variable, progressively sweeping from a low frequency such as 100 cycles per second to a high frequency such as 15,000 cycles per second, or may be a series of low-to-high frequency test signals such as 1000, 8000 and 15,000 Hz frequencies at successive discrete locations along the tape.

16 Claims, 5 Drawing Figures

AUTOMATIC AZIMUTH CONTROL FOR MAGNETIC TAPE RECORDING AND REPRODUCING APPARATUS

This application is a continuation-in-part of applicant's application Ser. No. 740,958 filed Nov. 11, 1976 under the same title now abandoned.

CROSS REFERENCES TO RELATED APPLICATIONS

Reference is made to the following co-pending related patent and patent applications assigned to the same assignee:
Jenkins Case 8 - U.S. Ser. No. 677,539
Filed Apr. 16, 1976
On MAGNETIC TAPE REPRODUCER WITH SERIES INTERCONNECTED TORQUE MOTORS IN PLAY MODE
U.S. Pat. No. 4,040,114 issued Aug. 2, 1977
On MAGNETIC TAPE REPRODUCER APPARATUS WITH MANUALLY OVERRIDEABLE CONNECTION BETWEEN TAPE LIFTER AND PRESSURE ROLLER
Jenkins Case 17-Design - U.S.Ser. No. 675,987
Filed Apr. 12, 1976
On MAGNETIC TAPE REPRODUCER

BACKGROUND OF THE INVENTION

The invention relates to multi-track recording and reproducing apparatus for magnetic tape and particularly to such apparatus for stereo recording and reproducing in commercial radio broadcasting where it may be required to operate continuously with the highest possible standards of reliability and durability.

The process of tape recording stereo signals for subsequent replay requires that very close control be maintained on the time or phase relationship between the two channels. Even closer control is required in recording and reproducing more than two channels. If two microphones provide input to a stereo recorder while making a master recording, and the tape is not held in perfect alignment or the heads are not perfectly aligned when this master recording is played back later, one channel may play back slightly ahead of the other. If this stereo signal is mixed and played back in a mono system, or if the stereo signal is broadcast in the conventional stereo manner and received in mono, the right and left channels will be electronically mixed. Cancellation of certain signals will occur in this situation. Depending upon the amount of misalignment during playback, signals of some frequencies may be 180° out of phase and will therefore cancel. Signals of other frequencies will be cancelled or distorted to varying extents. The relationship between frequency or wave length and the amount of cancellation will determine which frequencies will be cancelled or lowered in level.

This phase differential is of particular concern in a recorder-reproducer handling the standard National Association of Broadcasters cartridge. In a cartridge machine, the size and location of the tape guides are limited by the mechanical structure of the cartridge so there are no long tape paths and ample space for precision tape guidance as in reel-to-reel machines. Tape guidance in a cartridge machine is further deteriorated by the fact that the tape, being an endless loop, pulls off the center of the hub which is in a different plane than the normal tape running path and is pulled around a post in an effort to realign it before it passes the recording and reproducing heads. These considerations along with the fact that the cartridge case is molded of plastic parts which lack precision make a cartridge prone to phase cancellation or distortion. In a cartridge machine, if the phase error caused by tape skew is corrected during the recording process to make up for these tracking errors, it can be played back subsequently with good performance.

BRIEF SUMMARY OF THE INVENTION

A general object of the invention is to provide an automatic azimuth control for magnetic tape recording and reproducing apparatus.

An important object is to provide such apparatus which is so completely automatic that it will determine the precise amount of azimuth correction needed for optimum reproduction, and will skew one of the heads to make the correction, all within a second or so, in response to a single actuation of an azimuth control circuit.

A specific object is, before beginning a stereo or other multi-track recording operation, to record test signals through the gaps in the reproducing head, sense any time or phase differential between those test signal reproductions, and then actuate a reversible azimuth motor to skew one of the heads relative to the tape in a direction to synchronize or bring into phase the test signal reproductions.

GENERAL DESCRIPTION OF THE DRAWINGS

Other objects and advantages will be apparent from the following description taken in connection with the drawings in which.

Figure 1:
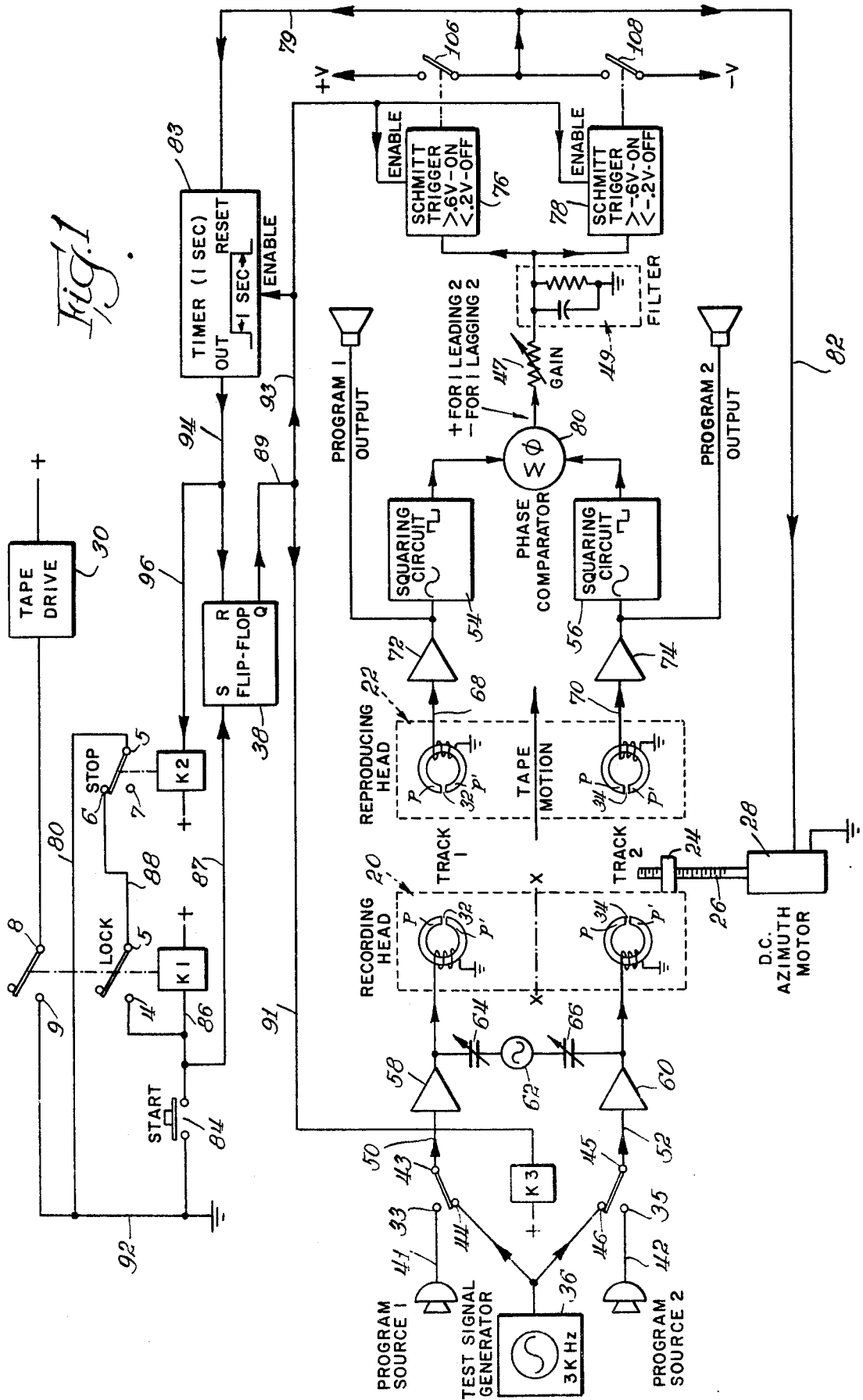
FIG. 1 is a diagrammatic representation of an azimuth control circuit according to the present invention.
Figure 3:
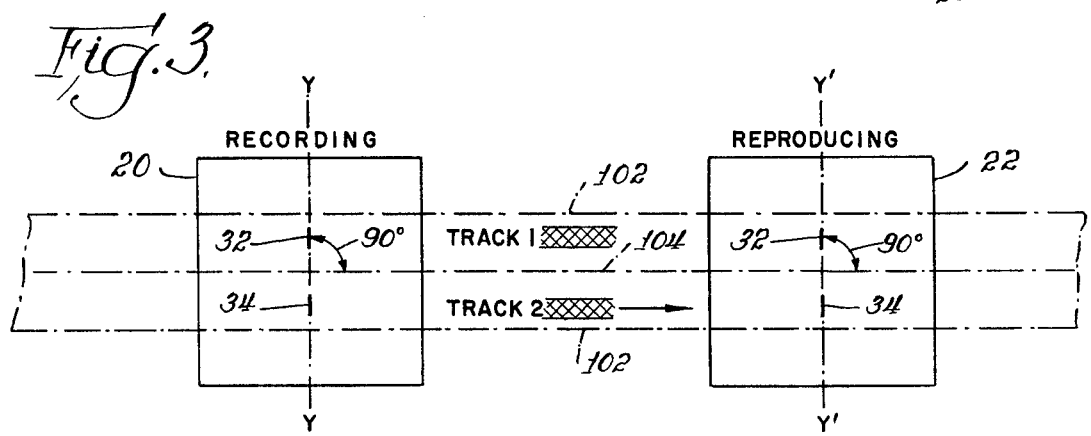
FIG. 3 is a diagrammatic representation of an ideal path of tape movement across recording and reproducing heads.
Figure 4:
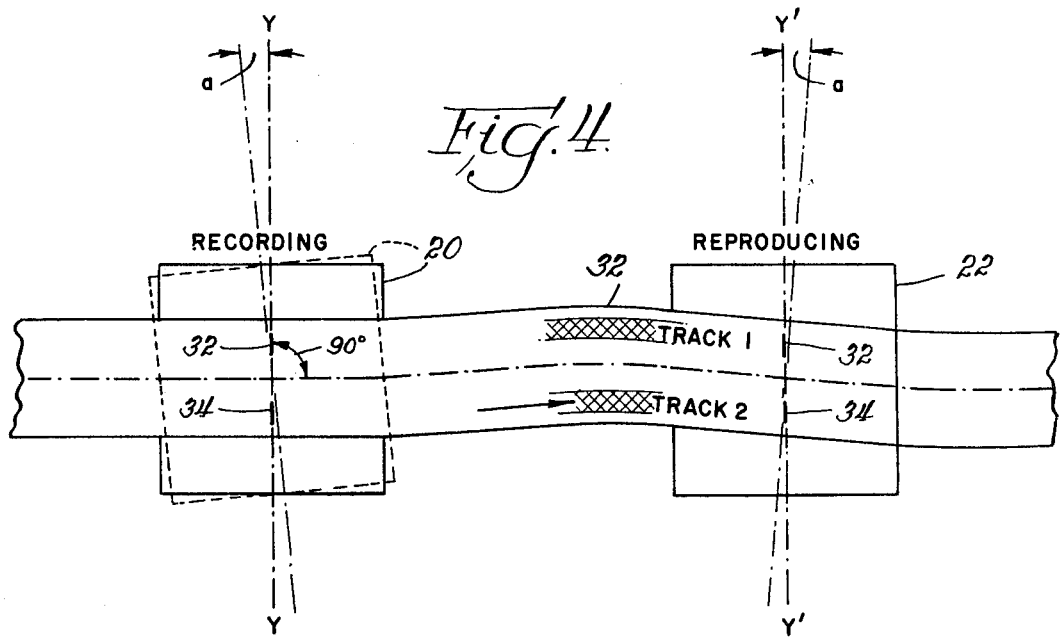
Figure 5:
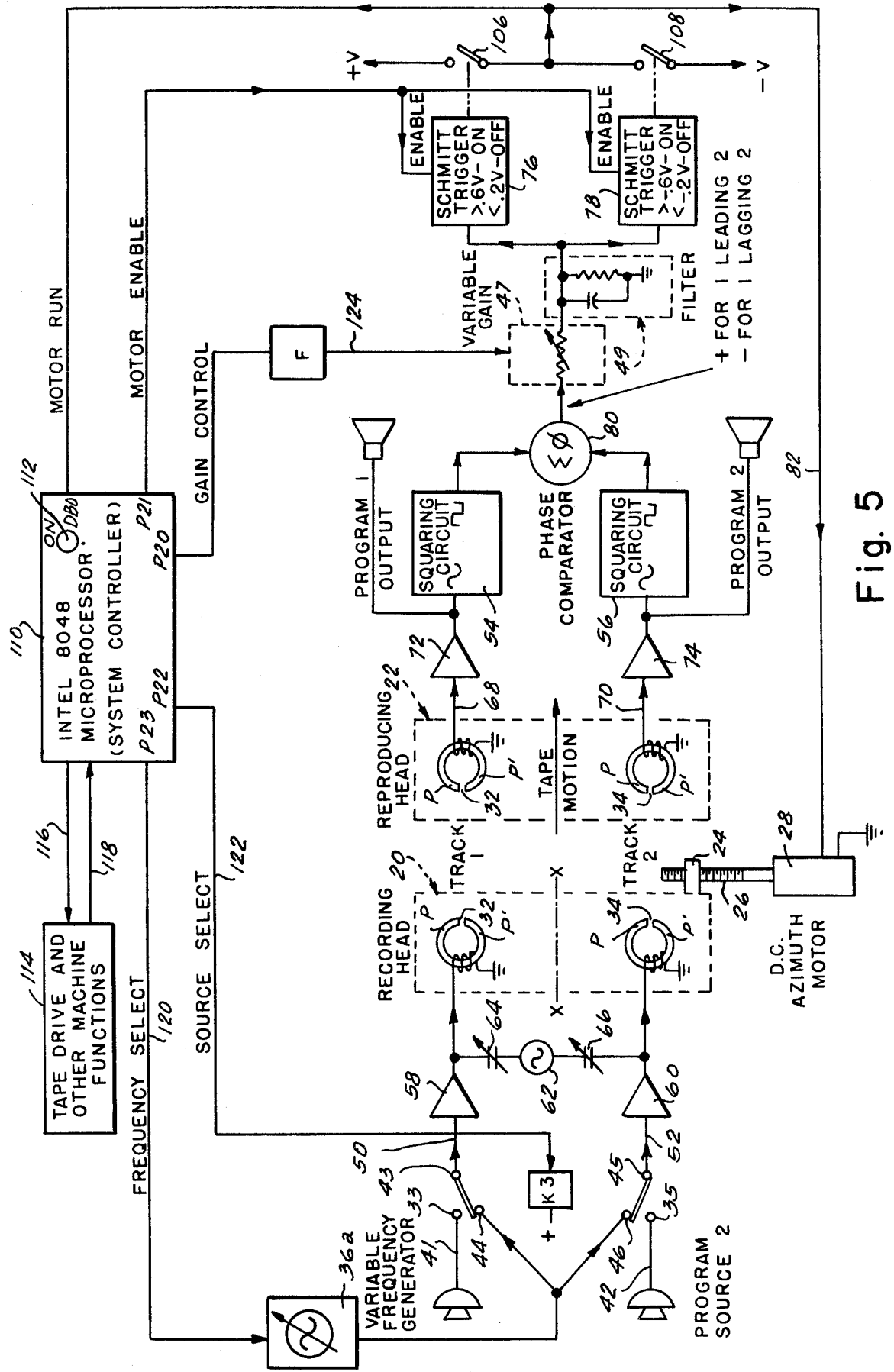

FIG. 4 is a view similar to FIG. 3 showing, much exaggerated for illustrative purposes, in solid lines, how tape may be skewed within a cartridge, as an inherent fault of that particular cartridge, and showing in broken lines how the azimuth of the recording head may be varied in accordance with the present invention prior to recording to compensate for the tape skew; and FIG. 5 is a view similar to FIG. 1 of an azimuth control circuit illustrating another embodiment of my invention.

DETAILED DESCRIPTION OF THE PREFERRED EMBODIMENT

The invention will be described as applied to a conventional recorder-reproducer using a standard NAB cartridge and having at least two heads, namely, recording and reproducing heads 20 and 22, respectively. Except for the modifications that the recording head 20 is pivoted for skew adjustment about a center axis X-X and is connected by lever 24 and screw 26 to a reversible azimuth motor 28, the mechanical and electrical arrangements of this apparatus may be conventional, well-known to those skilled in the art, and will not be repeated here in detail. The usefulness of this automatic azimuth control is not limited to cartridge type recorder-reproducers but it may be applied to others such as cassette apparatus, and reel-to-reel apparatus in some cases. As a specific example, applicant's three co-pending applications referred to above illustrate a reel-to-reel reproducer, which, if fitted with a recording head, might utilize the present invention although, as stated, reel-to-reel apparatus is less prone to tape skew and azimuth maladjustments than cartridge apparatus.

Figure 2:
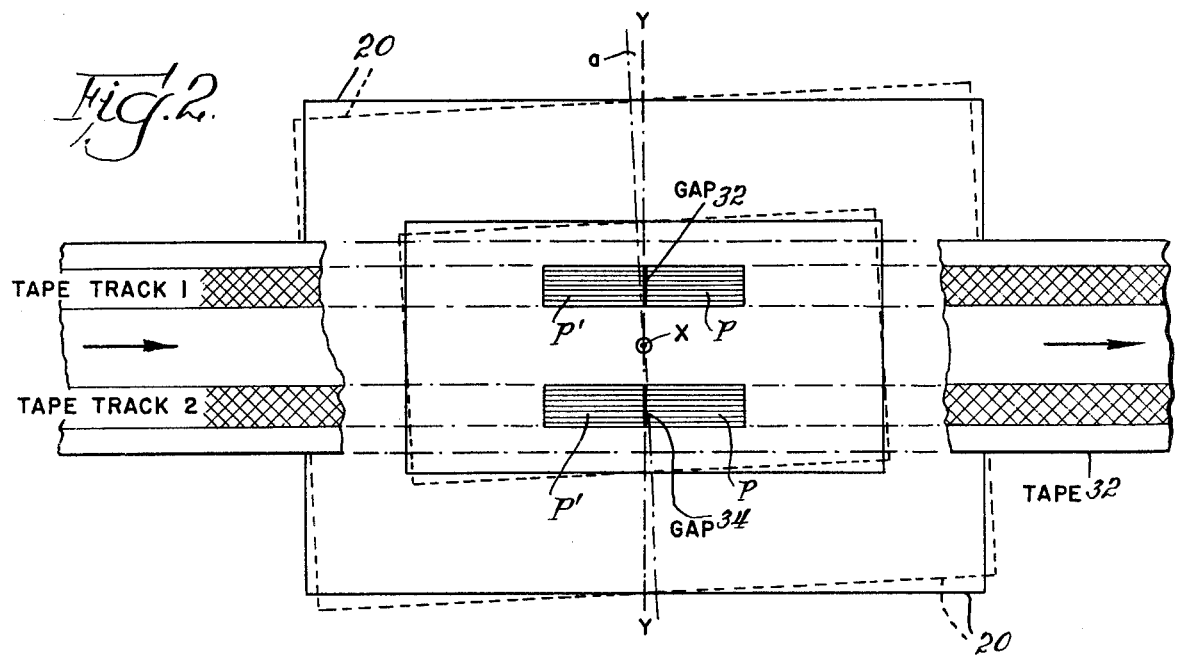
FIG. 2 is a front view of a typical stereo recording head illustrating it in different skewed positions relative to the tape.

The apparatus shown comprises a conventional tape drive 30 which, when actuated, moves tape 32 (FIGS. 2 and 4) from the recording head 20 to the reproducing head 22. Each head has two gaps 32, 34 defined between the usual transducer pole piece portions P, P'. It will be understood that the gaps 32, 34 of the recording head are actually aligned along a plane or axis Y-Y as shown in FIGS. 2, 3 and 4, and not disposed at right angles to that plane as diagrammatically represented in FIG. 1. Likewise, gaps 32, 34 of the reproducing head are actually aligned along a plane or axis Y'-Y' as shown in FIGS. 3 and 4. Gaps 32 and 34 of the recording head 20 record on tape Tracks 1 and 2, respectively; and gaps 32 and 34 of the reproducing head 22 pick up the respective signals on those tracks for playback. An important feature of the present invention is pivoting the recording head 20 about axix X-X, for example between solid and broken line positions shown in FIGS. 2 and 4, as required to bring into phase the test signal reproductions played back through the reproducing head.

Means for generating test signals for simultaneously recording on the two tracks in accordance with the present invention is generally designated 36. This is a tone generator. It may be a single or multiple pulse generator, or a fixed or variable frequency tone generator, among other possibilities. In the present case, the test signal generator 36 is a 3k Hz oscillator, although it may be substituted by a variable frequency tone generator where tape skew may be severe.

The automatic azimuth adjustment sequence is initiated by momentarily closing start switch 84. This simultaneously energizes relay K1 to actuate the tape drive 30 and set flip flop 38.

Tape drive 30 is energized to contact 8 and 9 of relay K1 and is held energized through a lock circuit including a conductor 86, contacts 4 and 5 of K1, conductor 88, contact 5 and 6 of K2, and conductors 90 and 92. This causes the tape to move from the recording to the reproducing head, this being from left to right in the drawings.

When the start switch 84 is momentarily closed, an impulse through conductor 87 drives the flip flop 38 to the set state. This applies power to the flip flop output terminal Q and conductors 89, 91 and 93. This does two things simultaneously with starting the tape drive: first, it activates or enables timer 83 and Schmitt triggers 76 and 78; second, it activates relay K3 thereby opening contacts 33/43 and 35/45, and closing contacts 43/44 and 45/46, all of K3. This disconnects program source conductors 41 and 42, and couples the test signal generator 36 to recording channels 50 and 52. 3k Hz test signals, amplified by amplifiers 58 and 60, are simultaneously recorded, in phase, on tape Tracks 1 and 2 through gaps 32 and 34 of the recording head 20. Bias oscillator 62 supplies high frequency bias to the separate gaps of the recording head in the usual way through variable capacitors 64 and 66.

The test signals so recorded on the tape are picked up in reproducing channels 68 and 70 by the gaps 32 and 34 of the reproducing head 22, after a short time delay required for the tape to move from the recording to the reproducing head. Thus, while the test signal is being placed on the tape by the recording head, it is moving forward to the reproducing head for playback through it. The test signals so picked up are then amplified by playback amplifiers 72 and 74 and separately converted into square waves by squaring circuits 54 and 56 and fed into a phase comparator 80, the output of which is positive pulses if the signal in channel 68 leads that in channel 70; conversely, the output of phase comparator 80 is negative pulses if the signal in channel 68 lags that in channel 70.

The phase comparator output, whether positive or negative pulses, then passes through a gain adjustment 47 into a filter 49 which smooths out the pulses into a steady DC signal. If this signal is greater than ± 0.6 volts, the appropriate one of the Schmitt triggers 76 or 78 will turn on. This closes one or the other of the switches 106 or 108 and connects a positive or negative DC voltage source through output conductor 82 to the DC azimuth motor 28, causing it to rotate in the proper direction to correct for the phase error.

As described, the azimuth motor 28 is mechanically coupled to the recording head 20 such that motor rotation will skew the recording head about the axis X-X to change the azimuth of the recording head. When the phase error has been corrected to the extent that the voltage from the appropriate Schmitt trigger is less than ± 0.2 volts, the output from the Schmitt trigger cuts off and motor 28 stops.

At any time that an output voltage, whether plus or minus exists in conductor 82 to drive the motor 28, that same voltage exists in conductor 79 which connects to the reset or dormant condition. When Schmitt trigger 76 or 78 drops to "Off" output condition, the timer 83 drops out of reset state and automatically activates. After a period of one second, in the particular embodiment shown, the timer times out and places an end of sequence pulse in the timer output conductor 94. This pulse is applied simultaneously to the reset terminal of the flip flop 38, and to stop relay K2, through conductors 94 and 96, thereby completely disabling all the circuitry associated with the automatic azimuth adjustment sequence as follows: by momentarily activating relay K2, contacts 5 and 6 thereof open the lock circuit for the tape drive 30 and stop tape movement. And, as a result of resetting flip flop 38, the enabling signal at its output terminal Q terminates, thereby deenergizing relay K3 and simultaneously disabling the timer 83 and the Schmitt triggers 76 and 78. Deenergizing relay K3 disconnects contacts 43/44 and 45/46 of K3 and reconnects contacts 33/43 and 35/45 thereof. This cuts the tone generator 36 completely out of the system, and reconnects the program source conductors 41 and 42 directly into the recording channels 50 and 52 for subsequent, normal recording operation with the assurance that the signals on Tracks 1 and 2 can be played back in phase through program outputs 1 and 2.

One convenient way of utilizing the automatic azimuth control is to actuate it, as by closing switch 84, when a new tape to be recorded is placed in the apparatus. This can be done by the operator actuating the switch 84 as described; alternatively, the azimuth control circuit may be actuated automatically, as for example by arranging switch 84 so that it will be closed momentarily in response to insertion of the cartridge into the apparatus.

Typically, the phase error encountered in NAB type cartridge machines will be less than 180° as measured with a 3000 Hz test signal and a tape speed of 7 ½ inches per second. In other words, the linear displacement of signals along Tracks 1 and 2 would be less than 0.00125 inches, (which is equivalent to 180° at that test frequency and tape speed.) Generally, therefore, where phase differences do not exceed 0.00125 inches, measured linearly of the tape, a fixed test tone such as 3000 Hz can be employed and the system will automatically rotate the recording head in a proper direction to bring the test signal reproductions into phase.

However, should there be cartridges which cause a phase error in excess of 0.00125 inches, a fixed tone test signal of 3000 Hz could automatically adjust in the wrong direction causing the recording head to center on some multiple of a 360° out of phase condition, rather than pulling it back into phase. Therefore, where there is some possibility that the phase error encountered may be more than the equivalent of 180° for any particular fixed frequency test signal and tape speed, the test signal generator 36 may be replaced by a ramp type signal generator which progressively varies the test signal frequency from a low to a high value in a constantly changing fashion. Thus, if the output frequency of the test signal generator is swept progressively from 100 Hz through 15000 Hz, this would allow the phase comparator 80 and motor 28 to detect and correct any phase error encountered, in ever refining increments as the frequency increases. This makes the aximuth control system completely independent of any particular tape speed, test signal frequency, misalignment, or tape skew. Depending upon the out of phase direction, whether leading or lagging, the phase comparator feeds an appropriate signal to the Schmitt triggers and actuates the azimuth motor 28. This, in turn, rotates the screw 26 in the proper direction to adjust the recording head azimuth until the phase comparator no longer sees any significant phase difference in the playback signals.

Use and operation of the invention is believed to be obvious from the foregoing description. However, one specific example of the automatic azimuth correction sequence will be described briefly.

First, refer to FIG. 3. This shows the ideal relationship of the recording and reproducing heads to the path 102 of tape movement. Here, the axes Y-Y and Y'-Y', along the gaps 32/34 of the recording and reproducing heads, are, ideally, precisely at right angles to the center line 104 of the tape path 102, which itself ideally is precisely straight. In this ideal case, recording and playback on the tape tracks would be precisely in phase. Reel-to-reel machines approach this ideal condition because they provide long tape paths and adequate space for precision tape guidance. But, as described above, this is not the case for tape cartridges which have short tape paths and inadequate space for precision tape guidance; and further tape guidance in the cartridge is deteriorated by the fact that the tape is an endless loop requiring the tape to be pulled off the center of the hub where it is in a different plane than the normal tape running path.

One example of an actual path which may be taken by a tape in a cartridge is shown in FIG. 4. Here, the heads themselves are shown with their axes Y-Y and Y'-Y' precisely parallel, just as in FIG. 3. But the tape itself is skewed at an angle "a", from the right angle position of FIG. 3, as it passes across the reproducing head. The degree of skew is much exaggerated for purpose of illustration. This skew means that, even though the signals are recorded in phase by the recording head, they will be played back out of phase because the signals in Track 1 will reach gap 32 before the corresponding signals in track 2 reach gap 34 in the reproducing head.

This skew is inherent in the cartridge itself because of the factors mentioned above and will cause the tape to play back out of phase whether reproduced in the same machine or a different one. By the present invention, the aximuth of one of the heads is automatically changed to compensate for the tape skew in this particular cartridge, so the two tracks will play back in phase. This, briefly, is done as follows.

Assume that the cartridge, with the tape shown in FIG. 4, is inserted in the machine, prior to recording. The flip flop 38 is in reset state, all circuitry associated with the automatic adjustment thereby being disabled.

The operator then momentarily closes start switch 84 which simultaneously starts the tape drive 30, and sets the flip flop 38. The tape drive is held by contacts 5 and 6 of relay K2. The flip flop 38, in the set state, holds the timer 83 and both Schmitt triggers 76 and 78 enabled, and energizes relay K3 to connect the tone generator 36 to the two recording channels 50 and 52. The 3k Hz test signals are simultaneously recorded on both Tracks 1 and 2 of the moving tape. When those signals reach the reproducing head, the phase comparator 80 will determine that the signal in Track 1 leads the signal in Track 2. This results in a positive DC signal output from filter 49 which turns on Schmitt trigger 76, closing the associated switch 106. This connects motor 28 to a positive voltage source, rotating screw 26 in the direction to adjust the azimuth of the recording head through an angle "a" from the solid line to the broken line position in FIGS. 2 and 4. At this time, the reproduced test signals will be in phase and the Schmitt trigger 76 will turn off. During the time that the voltage for running the motor was applied to the conductor 82, that same voltage, applied to the conductor 79, holds the timer 83 in reset state. When the Schmitt trigger 76 turned off and opened switch 106 to disconnect the positive voltage from the timer 83, the timer dropped out of reset state and one second later sent an output pulse to conductor 94 to reset the flip flop 38 and thereby energize relay K2 to stop the tape drive.

Up to the moment that the timer is dropped out of reset state, this automatic azimuth adjustment will generally take less than a second to complete. As soon as the flip flop turns to reset state, the cartridge is ready for recordiny by means of a conventional system (not shown). Referring to FIG. 4, clockwise skew of tape as it passes the reproducing head, indicated by the angle "a", is precisely compensated by skewing the recording head the same angular amount counterclockwise. Reproductions from the tape in that cartridge will then be precisely in phase.

Referring now to the embodiment illustrated in FIG. 5, this is basically the same circuit as shown in FIG. 1 with a variable frequency generator 36a substituted for the 3k Hz generator 36, and with a microprocessor 110 monitoring and operating the various circuit components to carry out the automatic control sequence.

The microprocessor details form no part of the present invention so it will be described only with respect to its control functions on the circuit components. One specific microprocessor which has been used with success is Intel Corporation's model 8048.

The variable frequency generator 36a is capable of applying test signals of selected, different frequencies to the channels 50 and 52 in a predetermined order under control of the microprocessor. In the FIG. 5 embodiment, the generator 36a provides test signals at frequencies of 1k, 8k, and 15k Hz. As the description proceeds it will be apparent that other frequencies and more or less than three separate frequencies may be employed.

Operation with sequence controlled by the microprocessor 110 will now be described.

Tape drive and other machine functions generally designated 114 are under control of the microprocessor through conductors 116 and 118. In the method of operation to be described, depressing the on button 112 starts the tape drive and the automatic azimuth control sequence.

As soon as the tape is in motion, the microprocessor sends a signal through conductor 120 to generator 36a causing it to generate a test signal of 1000 cycles per second frequency. Another signal, through conductor 122 activates relay K3, opening contacts 33/43 and 35/45 and closing contacts 43/44 and 45/46. This disconnects program source conductors 41 and 42 and couples the test signal generator 36a to recording channels 50 and 52. The 1k test signal, amplified by amplifiers 58 and 60, are simultaneously recorded, in phase, on tape tracks 1 and 2 through gaps 32 and 34 of the recording head 20.

The 1k test signals so recorded on the tape are picked up in reproducing channels 68 and 70 by the gaps 32 and 34 of the reproducing head 22, after a short time delay required for the tape to move from the recording to the reproducing head. The test signals so picked up are then amplified by playback amplifier 72 and 74 and separately converted into square waves by squaring circuits 54 and 56 and fed into the phase comparator 80 described above. For this initial reproduction of the 1k test signals, the variable gain unit 47 is set by the microprocessor at a high or maximum gain for an initial adjustment in response to the 1k test signals. At high gain, a very small azimuth error will turn on the azimuth motor 28 whereas at low gain a larger error may not turn on the motor.

As described in connection with FIG. 1, the azimuth motor 28 is mechanically coupled to the recording head 20 such that motor rotation in response to one or the other of the Schmitt triggers 76 and 78 will skew the recording head 20 in a direction to reduce the phase error.

By beginning the azimuth control sequence with the variable gain unit 47 set at maximum, the system reacts very rapidly to rotate the recording head 20 in the proper direction to correct for the phase error. However, due to the high gain, the system has a tendency to be unstable and may overshoot beyond the condition in which the recorded signals in channels 68 and 70 are in phase.

Accordingly, at the peak of the first overshoot, or when motor 28 is shut off, the microprocessor causes the variable frequency generator 36a to apply a second, corrective test signal, at 8k Hz to the recording channels 50 and 52 simultaneously. As explained above, this causes a second corrective impulse to be applied to the motor 28 through the line 82 in a direction to further reduce the time differential or phase between the 8k Hz recorded signals. At this time the gain control 47 may still be held at maximum gain by the controller through gain control conductor 124. If so, the motor 28 may be sufficiently powered that it again overshoots the in-phase condition. At the peak of the next overshoot, which is the second one, the microprocessor again changes the variable frequency generator to generate a 15k Hz test signal for fine-tuning of the azimuth. At the same time the system gain is ramped down in the variable gain element 47. This reduction in gain causes the amplitude of the overshoot to decrease after the next operation of the azimuth motor 28 and causes the recording head 20 to converge on a near-zero error or time differential.

This completes the automatic azimuth control sequence, following which the microprocessor restores normal machine operation, readying it for recording and playback at proper-in-phase condition.

While three separate, ever-refining adjustments are automatically carried out in response to sequential recording and playback of test signals at 1k, 8k and 15k Hz at discrete locations along the tape, any plurality of test signals may be employed in practicing the present invention. For example in some cases only two separate frequencies need be employed and in some cases, for extreme accuracy, more than three may be required.

The microprocessor output P20 for the variable gain control 14 is actually a rectangular wave of varying duty cycle. When the duty cycle is 100% (full on), gain is maximum. The duty cycle, under software control, decreases linearly from full on (100%) to full off (0%). This rectangular wave, whose frequency is approximately 1.5 Hz, is converted to a D.C. level by filtering through a filter F.

While two forms in which the present invention may be embodied have been shown and described, including both fixed and variable frequency test tone generators, it will be understood that various other modifications may be made within the spirit and scope of the invention which would be limited only by claims. For example, the reproducing head, instead of the recording head, may in some instances be pivotally mounted for adjustment by the azimuth motor, it being essential only that one or the other of the heads be so adjustable in the practice of the invention.

The embodiments of the invention in which an exclusive property or priviledge is claimed are defined as follows:

1. In apparatus for recording and reproducing signals along multiple tracks on a magnetic tape, tape driving means for moving the tape consecutively past a recording head and a reproducing head, each of the heads having at least two gaps defined between transducer pole piece portions for recording or reproducing along a corresponding number of tape tracks, automatic azimuth control means comprising:
   signal generator means for generating variable frequency test signals:
   means for recording said test signals simultaneously on said tracks through said gaps on the recording head at frequencies which vary from low to high frequency;
   means for making productions of said test signals through said gaps on the reproducing head;
   means for sensing time relationship of such test signal reproductions; and
   skew means responsive to time differential of said test signal reproductions to skew the head-to-tape relation at one of said heads progressively in a direction to synchronize said test signal reproductions.

2. In apparatus for recording and reproducing signals along multiple tracks on a magnetic tape, automatic azimuth control means according to claim 1 in which:

said means for generating variable frequency test signals comprises a varying frequency tone generator producing said test signals which sweep progressively from low to high frequencies.

3. In apparatus for recording and reproducing signals along multiple tracks on magnetic tape, automatic azimuth control means according to claim 2 in which: said test signals seeep in frequency from approximately 100 Hz to 15,000 Hz.

4. In apparatus for recording and reproducing signals along multiple tracks on a magnetic tape, automatic azimuth control means according to claim 1 including: time delay means for automatically deactivating said means for recording said test signals after a predetermined time period following synchronization of said test signal reproductions.

5. In apparatus for recording and reproducing signals along multiple tracks on a magnetic tape, automatic azimuth control means according to claim 1 including means for recording said test signals at a plurality of different frequencies successively along said tracks.

6. In apparatus for recording and reproducing signals along multiple tracks on a magnetic tape, automatic azimuth control means according to claim 1 including means for recording different low-to-high frequency test signals at successive discrete locations along said tape, and means successively responsive to time differentials of said test reproductions at each of said locations to successively skew the head-to-tape relation in a direction to progressively reduce said time differentials by a series of successive operations.

7. In apparatus for recording and reproducing signals along multiple tracks on a magnetic tape, automatic azimuth control means according to claim 6 including variable gain means controlling the operation of said skew means, and means for varying said gain means to modify the operation of said skew means during the final operation thereof, for minimizing said time differential.

8. In apparatus for recording and reproducing signals along multiple tracks on a magnetic tape, automatic azimuth control means according to claim 7 including means for varying said gain means simultaneously with recording the high frequency test signals on said tape.

9. In apparatus for recording and reproducing signals along multiple tracks on a magnetic tape, automatic azimuth control means according to claim 1, including: means for recording an initial low frequency test signal simultaneously on said tracks and for subsequently recording a final high frequency test signal simultaneously at discrete locations on said tracks; and
said skew means being operable successively in response to time differential of the reproductions of said test signals to successively skew said head-to-tape relation in a direction to synchronize said test signal reproductions.

10. In apparatus for recording and reproducing signals along multiple tracks on a magnetic tape, automatic azimuth control means according to claim 9, including: means for recording at least one intermediate frequency test signal simultaneously on said tracks at discrete locations between said low and high frequency test signals.

11. In apparatus for recording and reproducing signals along multiple tracks on a magnetic tape, automatic azimuth control means according to claim 9, including:
variable gain means controlling the operation of said skew means; and
means for ramping down said variable gain means to reduce the output thereof following recording of said initial low frequency test signal.

12. In apparatus for recording and reproducing signals along multiple tracks on a magnetic tape, tape driving means for moving the tape consecutively past a recording head and a reproducing head, each of the heads having at least two gaps defined between transducer pole piece portions for recording or reproducing along a corresponding number of tape tracks, automatic azimuth control means comprising:
a tone generator for generating test signals;
means for recording said test signals simultaneously in phase on said tracks through said gaps on the recording head;
means for pivotally mounting one of said heads on said housing to vary the skew angle of that head relative to the tape;
motor means connected to said one head and effective when activated to pivotally move said one head to adjust said skew angle;
a signal comparator connected to said gaps on the reproducing head and effective to sense the time relationship of test signal reproductions;
means responsive to sensing time differential of said test signal reproductions by said signal comparator, for activating said motor means to pivotally move said head in a direction for synchronizing said test signal reproductions; and
time delay means regulating the duration of recording said test signals on said tracks following synchronizing of said test signal reproductions.

13. A method for azimuth control in stereo recording and reproducing apparatus in which a magnetic tape with multiple recording tracks is moved consecutively past a recording head and a reproducing head, comprising the steps of:
(a) recording test signals simultaneously along said tracks through said recording head at frequencies which vary from low to high frequencies;
(b) making reproductions of said test signals along said tracks through said reproducing head;
(c) determining time differentials between the test signal reproductions; and
(d) progressively varying the skew relation of one of said heads relative to the tape in a direction to synchronize and test signal reproductions.

14. A method for azimuth control according to the steps of claim 13 in which said test signals sweep in frequency progressively from low to high frequency.

15. A method for azimuth control according to the steps of claim 13 in which said test signals are recorded at a plurality of different frequencies successively along said tracks.

16. A method for azimuth control according to the steps of claim 15 in which said test signals are recorded at 1000, 8000 and 15,000 cycles per second successively along said tracks.

* * * * *

UNITED STATES PATENT OFFICE
CERTIFICATE OF CORRECTION

Patent No. 4,101,937                    Dated July 18, 1978

Inventor(s) John P. Jenkins

It is certified that error appears in the above-identified patent and that said Letters Patent are hereby corrected as shown below:

Column 3, line 24, "axix" should be --axis--.

Column 5, line 28, "aximuth" should be --azimuth--.

Column 6, line 9, "aximuth" should be --azimuth--.

Column 8, line 53, ":" should be --;--.

Column 9, line 8, "seeep" should be --sweep--.

Signed and Sealed this

Thirtieth Day of January 1979

[SEAL]

Attest:

RUTH C. MASON
Attesting Officer

DONALD W. BANNER
Commissioner of Patents and Trademarks